United States Patent
Varkey et al.

(10) Patent No.: US 12,436,347 B2
(45) Date of Patent: Oct. 7, 2025

(54) STRANDED FIBER-OPTIC CABLE

(71) Applicant: Schlumberger Technology Corporation, Sugar Land, TX (US)

(72) Inventors: Joseph Varkey, Richmond, TX (US); Maria Grisanti, Missouri City, TX (US); David Kim, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/621,094

(22) PCT Filed: Jun. 29, 2020

(86) PCT No.: PCT/US2020/040118
§ 371 (c)(1),
(2) Date: Dec. 20, 2021

(87) PCT Pub. No.: WO2020/264494
PCT Pub. Date: Dec. 30, 2020

(65) Prior Publication Data
US 2022/0350101 A1    Nov. 3, 2022

Related U.S. Application Data (60) Provisional application No. 62/868,321, filed on Jun. 28, 2019.

(51) Int. Cl.
G02B 6/44    (2006.01)

(52) U.S. Cl.
CPC ......... *G02B 6/4413* (2013.01); *G02B 6/4415* (2013.01); *G02B 6/4486* (2013.01); *G02B 6/4416* (2013.01)

(58) Field of Classification Search
CPC ... G02B 6/4413; G02B 6/4421; G02B 6/4415
See application file for complete search history.

(56) References Cited

U.S. PATENT DOCUMENTS

| | | |
|---|---|---|
| 1,948,439 A | 2/1934 | Budscheid |
| 1,973,091 A | 9/1934 | Miller |
| 1,995,071 A | 3/1935 | Mackenzie |
| | (Continued) | |

FOREIGN PATENT DOCUMENTS

| | | |
|---|---|---|
| CA | 2244833 A1 | 3/1999 |
| CN | 2755741 Y | 2/2006 |
| | (Continued) | |

OTHER PUBLICATIONS

JPH0195834A English translation (Year: 1989).*
(Continued)

*Primary Examiner* — Charlie Y Peng
(74) *Attorney, Agent, or Firm* — Jeffrey D. Frantz (57) ABSTRACT

A fiber optic bundle for incorporation into a cable for use in a well. The bundle includes multiple fiber optic threads that are helically wound about one another at a zero degree lay angle for structural reinforcement. Further, the cable that employs the bundle may be coupled in nature and gas proof thereby rendering the fiber optics mechanically responsive for improved accuracy in detections during use in a well application.

18 Claims, 7 Drawing Sheets

(56) References Cited

U.S. PATENT DOCUMENTS

| | | | |
|---|---|---|---|
| 2,002,061 | A | 5/1935 | House |
| 2,003,001 | A | 5/1935 | Leece |
| 2,118,629 | A | 5/1938 | Waldron |
| 2,576,227 | A | 11/1951 | Hutchins, Jr. |
| 2,604,509 | A | 7/1952 | Blanchard |
| 3,115,542 | A | 12/1963 | Palandri |
| 3,127,083 | A | 3/1964 | Guyer |
| 3,217,083 | A | 11/1965 | Gore |
| 3,259,675 | A | 7/1966 | Bowers |
| 3,313,346 | A | 4/1967 | Cross |
| 3,328,140 | A | 6/1967 | Warren |
| 3,346,045 | A | 10/1967 | Knapp |
| 3,482,034 | A | 12/1969 | Rhoades |
| 3,490,125 | A | 1/1970 | Frieling, Jr. |
| 3,554,284 | A | 1/1971 | Nystrom |
| 3,567,879 | A | 3/1971 | Dueker |
| 3,573,349 | A | 4/1971 | Bowers |
| 3,634,607 | A | 1/1972 | Coleman |
| 3,679,812 | A | 7/1972 | Owens |
| 3,681,514 | A | 8/1972 | Rhoades |
| 3,710,859 | A | 1/1973 | Hanes |
| 3,758,704 | A | 9/1973 | Naud |
| 3,766,307 | A | 10/1973 | Andrews |
| 4,016,942 | A | 4/1977 | Wallis, Jr. |
| 4,059,951 | A | 11/1977 | Roe |
| 4,077,022 | A | 2/1978 | Pitts, Jr. |
| 4,131,757 | A | 12/1978 | Felkel |
| 4,131,758 | A | 12/1978 | Felkel |
| 4,197,423 | A | 4/1980 | Fusen |
| 4,250,351 | A | 2/1981 | Bridges |
| 4,259,544 | A | 3/1981 | Litauer |
| 4,281,716 | A | 8/1981 | Hall |
| 4,292,588 | A | 9/1981 | Smith |
| 4,409,431 | A | 10/1983 | Neuroth |
| 4,486,252 | A | 12/1984 | Lloyd |
| 4,522,464 | A | 6/1985 | Thompson |
| 4,523,804 | A | 6/1985 | Thompson |
| 4,525,813 | A | 6/1985 | Burrage |
| 4,547,774 | A | 10/1985 | Gould |
| 4,577,693 | A | 3/1986 | Graser |
| 4,606,604 | A | 8/1986 | Soodak |
| 4,644,094 | A | 2/1987 | Hoffman |
| 4,645,298 | A | 2/1987 | Gartside, III |
| 4,673,041 | A | 6/1987 | Turner |
| 4,675,474 | A | 6/1987 | Neuroth |
| 4,696,542 | A * | 9/1987 | Thompson ............ G02B 6/4427 |
| | | | 385/108 |
| 4,722,589 | A | 2/1988 | Priaroggia |
| 4,729,629 | A | 3/1988 | Saito |
| 4,743,711 | A | 5/1988 | Hoffman |
| 4,762,180 | A | 8/1988 | Wybro |
| 4,767,182 | A | 8/1988 | Parfree |
| 4,768,984 | A | 9/1988 | de Oliveira |
| 4,818,060 | A | 4/1989 | Arroyo |
| 4,825,953 | A | 5/1989 | Wong |
| 4,830,113 | A | 5/1989 | Geyer |
| 4,899,823 | A | 2/1990 | Cobb |
| 4,920,738 | A | 5/1990 | White et al. |
| 4,952,012 | A | 8/1990 | Stamnitz |
| 4,979,795 | A | 12/1990 | Mascarenhas |
| 4,986,360 | A | 1/1991 | Laky |
| 4,993,492 | A | 2/1991 | Cressey |
| 5,002,130 | A | 3/1991 | Laky |
| 5,088,559 | A | 2/1992 | Taliaferro |
| 5,125,061 | A | 6/1992 | Marlier |
| 5,125,062 | A | 6/1992 | Marlier |
| 5,150,443 | A | 9/1992 | Wijnberg |
| 5,329,605 | A | 7/1994 | Wargotz |
| 5,339,378 | A | 8/1994 | Simonds |
| 5,431,759 | A | 7/1995 | Neuroth |
| 5,438,164 | A | 8/1995 | Green |
| 5,495,547 | A | 2/1996 | Rafie et al. |
| 5,751,879 | A * | 5/1998 | Graham ................ G02B 6/4479 |
| | | | 385/103 |
| 5,778,981 | A | 7/1998 | Head |
| 5,787,217 | A | 7/1998 | Traut |
| 5,857,523 | A | 1/1999 | Edwards |
| 5,894,104 | A | 4/1999 | Hedberg |
| 5,930,431 | A | 7/1999 | Lail |
| 6,015,013 | A | 1/2000 | Edwards |
| 6,030,255 | A | 2/2000 | Konishi |
| 6,053,252 | A | 4/2000 | Edwards |
| 6,060,662 | A | 5/2000 | Rafie et al. |
| 6,116,345 | A | 9/2000 | Fontana |
| 6,161,619 | A | 12/2000 | Head |
| 6,182,765 | B1 | 2/2001 | Kilgore |
| 6,195,487 | B1 | 2/2001 | Anderson |
| 6,211,467 | B1 | 4/2001 | Berelsman |
| 6,276,456 | B1 | 8/2001 | Head |
| 6,334,015 | B2 * | 12/2001 | Jamet ..................... G02B 6/441 |
| | | | 385/100 |
| 6,374,023 | B1 * | 4/2002 | Parris ................ G02B 6/44382 |
| | | | 385/100 |
| 6,386,290 | B1 | 5/2002 | Headworth |
| 6,389,204 | B1 * | 5/2002 | Hurley ................ G02B 6/4432 |
| | | | 385/113 |
| 6,392,151 | B1 | 5/2002 | Rafie et al. |
| 6,403,889 | B1 | 6/2002 | Mehan |
| 6,442,304 | B1 | 8/2002 | Crawley |
| 6,484,806 | B2 | 11/2002 | Childers |
| 6,488,093 | B2 | 12/2002 | Moss |
| 6,555,752 | B2 | 4/2003 | Dalrymple |
| 6,559,383 | B1 | 5/2003 | Martin |
| 6,559,385 | B1 | 5/2003 | Johnson |
| 6,600,108 | B1 | 7/2003 | Mydur et al. |
| 6,631,095 | B1 | 10/2003 | Bryant |
| 6,659,180 | B2 | 12/2003 | Moss |
| 6,675,888 | B2 | 1/2004 | Schempf |
| 6,691,775 | B2 | 2/2004 | Headworth |
| 6,745,840 | B2 | 6/2004 | Headworth |
| 6,747,213 | B2 | 6/2004 | Bonicel |
| 6,763,889 | B2 | 7/2004 | Rytlewski |
| 6,775,444 | B1 | 8/2004 | Hurley |
| 6,776,195 | B2 | 8/2004 | Blasko |
| 6,807,988 | B2 | 10/2004 | Powell |
| 6,834,724 | B2 | 12/2004 | Headworth |
| 6,843,321 | B2 | 1/2005 | Carlsen |
| 6,919,512 | B2 | 7/2005 | Guven |
| 6,922,512 | B2 * | 7/2005 | Nechitailo ......... G02B 6/44384 |
| | | | 385/113 |
| 7,000,903 | B2 | 2/2006 | Piecyk |
| 7,116,283 | B2 | 10/2006 | Benson |
| 7,119,283 | B1 | 10/2006 | Varkey |
| 7,139,218 | B2 | 11/2006 | Hall |
| 7,170,007 | B2 | 1/2007 | Varkey |
| 7,235,743 | B2 | 6/2007 | Varkey |
| 7,282,644 | B1 | 10/2007 | Alvey |
| 7,288,721 | B2 | 10/2007 | Varkey |
| 7,326,854 | B2 | 2/2008 | Varkey |
| 7,331,393 | B1 | 2/2008 | Hoel |
| 7,402,753 | B2 | 7/2008 | Varkey |
| 7,462,781 | B2 | 12/2008 | Varkey |
| 7,465,876 | B2 | 12/2008 | Varkey |
| 7,699,114 | B2 | 4/2010 | Ullah et al. |
| 7,700,880 | B2 | 4/2010 | Varkey |
| 7,719,283 | B2 | 5/2010 | Ishikawa |
| 7,730,936 | B2 | 6/2010 | Hernandez-Solis |
| 7,793,409 | B2 | 9/2010 | Varkey |
| 7,798,234 | B2 | 9/2010 | Ju |
| 7,845,412 | B2 | 12/2010 | Sbordone |
| 8,011,435 | B2 | 9/2011 | Carossino |
| 8,218,925 | B2 | 7/2012 | Bohler et al. |
| 8,227,697 | B2 | 7/2012 | Varkey |
| 8,387,701 | B2 | 3/2013 | Sbordone |
| 8,413,723 | B2 | 4/2013 | Varkey |
| 8,639,075 | B1 | 1/2014 | Burnett |
| 8,807,225 | B2 | 8/2014 | Varkey |
| 8,886,000 | B2 | 11/2014 | Register, III et al. |
| 8,901,425 | B2 | 12/2014 | Varkey |
| 8,929,702 | B2 | 1/2015 | Varkey et al. |
| 8,960,271 | B2 | 2/2015 | Lahijani |
| 8,969,726 | B2 | 3/2015 | Varkey |
| 9,024,189 | B2 | 5/2015 | Basak et al. |
| 9,027,657 | B2 | 5/2015 | Varkey |

(56) References Cited

U.S. PATENT DOCUMENTS

| | | | |
|---|---|---|---|
| 9,058,921 B2 | 6/2015 | Congdon et al. | |
| 9,069,148 B2 | 6/2015 | Herbst | |
| 9,091,154 B2 | 7/2015 | Weerasinghe et al. | |
| 9,182,303 B2 | 11/2015 | Lowell | |
| 9,188,756 B2 | 11/2015 | Register, III et al. | |
| 9,335,503 B2 | 5/2016 | Kachmar | |
| 9,368,260 B2 | 6/2016 | Varkey | |
| 9,412,492 B2 | 8/2016 | Varkey | |
| 9,412,502 B2 | 8/2016 | Magner | |
| 9,691,523 B2 | 6/2017 | Pourladian et al. | |
| 9,947,437 B2 | 4/2018 | Li et al. | |
| 10,001,613 B2 | 6/2018 | Varkey et al. | |
| 10,049,789 B2 | 8/2018 | Varkey et al. | |
| 10,087,717 B2 | 10/2018 | Varkey | |
| 10,215,939 B1 | 2/2019 | Varkey et al. | |
| 10,268,015 B2 | 4/2019 | Sato et al. | |
| 10,593,444 B2 | 3/2020 | Schwartz et al. | |
| 10,612,947 B2 | 4/2020 | Kishida et al. | |
| 11,066,591 B2 | 7/2021 | Khramov | |
| 11,268,329 B2 | 3/2022 | Varkey | |
| 11,387,014 B2 | 7/2022 | Varkey | |
| 11,814,570 B2 | 11/2023 | Barmatov | |
| 11,952,324 B2 | 4/2024 | Khramov | |
| 2003/0011489 A1 | 1/2003 | Viswanathan | |
| 2003/0082380 A1 | 5/2003 | Hager | |
| 2003/0163179 A1 | 8/2003 | Hoglund | |
| 2004/0163822 A1 | 8/2004 | Zhang | |
| 2004/0262027 A1 | 12/2004 | Kaczmarski | |
| 2005/0217844 A1 | 10/2005 | Edwards | |
| 2005/0219063 A1 | 10/2005 | Viswanathan | |
| 2006/0018611 A1* | 1/2006 | Maida, Jr. | G02B 6/4492 385/100 |
| 2006/0024842 A1 | 2/2006 | Nylese | |
| 2006/0045442 A1* | 3/2006 | Varkey | G02B 6/4413 385/103 |
| 2006/0104579 A1 | 5/2006 | Fitz | |
| 2006/0151194 A1 | 7/2006 | Varkey | |
| 2006/0187084 A1 | 8/2006 | Hernandez-Marti | |
| 2006/0211286 A1 | 9/2006 | Shuey | |
| 2006/0221768 A1 | 10/2006 | Hall | |
| 2006/0237217 A1 | 10/2006 | Glew | |
| 2006/0237218 A1 | 10/2006 | Glew | |
| 2006/0242824 A1 | 11/2006 | Varkey et al. | |
| 2007/0000682 A1 | 1/2007 | Varkey | |
| 2007/0003780 A1 | 1/2007 | Varkey | |
| 2007/0044991 A1 | 3/2007 | Varkey | |
| 2007/0059499 A1 | 3/2007 | Yuasa | |
| 2007/0158095 A1 | 7/2007 | Sridhar | |
| 2007/0196557 A1 | 8/2007 | Weissman et al. | |
| 2008/0031578 A1 | 2/2008 | Varkey | |
| 2008/0083533 A1 | 4/2008 | Malone | |
| 2008/0118209 A1 | 5/2008 | Varkey et al. | |
| 2008/0156517 A1 | 7/2008 | Varkey | |
| 2008/0166093 A1 | 7/2008 | Shinoski | |
| 2008/0190612 A1 | 8/2008 | Buchanan | |
| 2008/0247717 A1 | 10/2008 | Patlakh | |
| 2008/0247718 A1 | 10/2008 | Dowd | |
| 2008/0267569 A1 | 10/2008 | Ginocchio | |
| 2009/0034920 A1 | 2/2009 | Dowd | |
| 2009/0038149 A1 | 2/2009 | Varkey | |
| 2009/0046986 A1 | 2/2009 | Maeda et al. | |
| 2009/0089998 A1 | 4/2009 | Varkey | |
| 2009/0194296 A1 | 8/2009 | Gillan | |
| 2009/0194314 A1 | 8/2009 | Varkey | |
| 2009/0283295 A1 | 11/2009 | Varkey | |
| 2010/0038112 A1 | 2/2010 | Grether | |
| 2010/0255186 A1 | 10/2010 | Montes | |
| 2010/0260459 A1 | 10/2010 | Bohler | |
| 2011/0075979 A1 | 3/2011 | Ma et al. | |
| 2011/0232936 A1 | 9/2011 | Magner | |
| 2011/0293228 A1* | 12/2011 | Keller | G02B 6/4486 385/103 |
| 2012/0125596 A1 | 5/2012 | Homa et al. | |
| 2012/0222869 A1 | 9/2012 | Varkey | |
| 2012/0257864 A1 | 10/2012 | Consonni | |
| 2013/0026314 A1 | 1/2013 | Hu et al. | |
| 2013/0227837 A1 | 9/2013 | Varkey | |
| 2013/0331303 A1 | 12/2013 | Rife | |
| 2014/0212609 A1 | 7/2014 | Stratton | |
| 2014/0352952 A1 | 12/2014 | Varkey | |
| 2015/0233200 A1 | 8/2015 | Varkey | |
| 2015/0294762 A1 | 10/2015 | Varkey | |
| 2015/0294763 A1 | 10/2015 | Varkey | |
| 2015/0348677 A1 | 12/2015 | Pourladian | |
| 2016/0024902 A1 | 1/2016 | Richter | |
| 2016/0025945 A1 | 1/2016 | Wanjau | |
| 2016/0222736 A1 | 8/2016 | Varkey et al. | |
| 2016/0329128 A1 | 11/2016 | Varkey | |
| 2017/0268304 A1 | 9/2017 | Varkey | |
| 2017/0358385 A1 | 12/2017 | Varkey | |
| 2018/0025884 A1 | 1/2018 | Flitsch | |
| 2018/0073310 A1 | 3/2018 | Varkey et al. | |
| 2018/0137953 A1 | 5/2018 | Varkey | |
| 2018/0252884 A1* | 9/2018 | Quinn | G02B 6/4413 |
| 2018/0366240 A1 | 12/2018 | Varkey | |
| 2019/0064459 A1 | 2/2019 | Varkey | |
| 2019/0101715 A1* | 4/2019 | Hudson, II | G02B 6/4434 |
| 2019/0170955 A1 | 6/2019 | Varkey et al. | |
| 2019/0279786 A1 | 9/2019 | Varkey | |
| 2020/0081209 A1* | 3/2020 | Martin Regalado | G02B 6/4436 |
| 2020/0123866 A1 | 4/2020 | Varkey | |
| 2020/0126691 A1 | 4/2020 | Varkey | |
| 2021/0055475 A1 | 2/2021 | Varkey et al. | |
| 2023/0374365 A1 | 11/2023 | Khramov | |

FOREIGN PATENT DOCUMENTS

| | | | |
|---|---|---|---|
| CN | 201327731 Y | 10/2009 | |
| CN | 201413731 Y | 2/2010 | |
| CN | 101726814 A | 6/2010 | |
| CN | 101876733 A | 11/2010 | |
| CN | 202487261 U * | 10/2012 | |
| CN | 103502864 A | 1/2014 | |
| CN | 103620465 A | 3/2014 | |
| CN | 104914541 A * | 9/2015 | G02B 6/44384 |
| CN | 204882979 U * | 12/2015 | |
| CN | 205542137 U | 8/2016 | |
| CN | 106537210 A | 3/2017 | |
| CN | 106716209 A | 5/2017 | |
| CN | 109116494 A | 1/2019 | |
| CN | 208444062 | 1/2019 | |
| CN | 109581605 A | 4/2019 | |
| CN | 208767077 | 4/2019 | |
| EP | 0003104 A1 | 7/1979 | |
| EP | 471600 A1 | 2/1992 | |
| EP | 0996014 A1 | 4/2000 | |
| EP | 1216342 A1 | 6/2002 | |
| EP | 2039878 A1 | 3/2009 | |
| EP | 3108098 A1 | 12/2016 | |
| EP | 3250785 A1 | 12/2017 | |
| FR | 2776861 A1 | 3/1999 | |
| GB | 2234772 A | 2/1991 | |
| JP | 54007186 A | 1/1979 | |
| JP | H0195834 A * | 4/1989 | B21F 1/02 |
| JP | 2216710 A | 8/1990 | |
| JP | H08508829 A * | 9/1996 | G02B 6/449 |
| JP | 2002243999 A | 8/2002 | |
| JP | 2003151375 A | 5/2003 | |
| KR | 0137668 B1 | 6/1998 | |
| KR | 20000046916 | 12/1998 | |
| KR | 20120026938 A | 3/2012 | |
| WO | 9948111 A1 | 9/1999 | |
| WO | 0125593 A1 | 4/2001 | |
| WO | 02071178 A2 | 9/2002 | |
| WO | 2006003362 A1 | 1/2006 | |
| WO | 2006027553 A1 | 3/2006 | |
| WO | 2006088372 A1 | 8/2006 | |
| WO | 2007034242 A1 | 3/2007 | |
| WO | 2008132637 A1 | 11/2008 | |
| WO | 2011037974 A2 | 3/2011 | |
| WO | WO-2013017906 A1 * | 2/2013 | B29D 11/00701 |

(56) References Cited

FOREIGN PATENT DOCUMENTS

| WO | 2020264494 A1 | 12/2020 |
|---|---|---|
| WO | 2020264498 A1 | 12/2020 |
| WO | 2022261390 A1 | 12/2022 |

OTHER PUBLICATIONS

English translation of JPH10170778A (Year: 1998).*
English translation of JPH10104482A (Year: 1998).*
Exam Report issued in United Kingdom Patent Application No. GB2118164.9 dated Oct. 27, 2022, 2 pages.
International Preliminary Report on Patentability issued in International Patent application PCT/US2020/040118, dated Jan. 6, 2022, 7 pages.
International Preliminary Report on Patentability issued in International Patent application PCT/US2020/040123, dated Jan. 6, 2022, 7 pages.
International Search Report and Written Opinion issued in International Patent application PCT/US2020/040118 on Oct. 15, 2020, 10 pages.
International Search Report and Written Opinion issued in International Patent application PCT/US2020/040123 on Oct. 15, 2020, 10 pages.
First Office Action issued in China Patent Application No. 2020800475714 dated Nov. 28, 2023, 23 pages with English translation.
First Office Action issued in China Patent Application No. 2020800460615 dated Jan. 4, 2024, 20 pages with English translation.
Examination Report issued n the related CA application 2774775, dated Aug. 16, 2016, (3 pages).
Lebedev, et al., "The breakdown Strength of two-layer dlielectrics", High Voltage Engineering, 1999. Eleventh International Symposium, Conf. Publ. No. 467, vol. 4, Aug. 22-27, 1999, pp. 304-307.
Salama, et al., "Instructional design of multi-layer insulation of power cabels". Power Systems, IEEE Transactions, vol. 7, Issue 1, Feb. 1992, pp. 377-382.
International Search Report and Written Opinion issued in the related PCT application PCT/US2010/049783, dated May 9, 2011 (7 pages).
International Preliminary Report on Patentability issued in the related PCT application PCT/US2010/049783, dated Mar. 22, 2012 (5 pages).
Examination Report issued in the related AU application 2010298356, dated Oct. 19, 2015, (3 pages).
Office Action issued in the related MX application MX/a/2012/003397, dated Jun. 30, 2015 (5 pages).
International Search Report and Written Opinion issued in the related PCT application PCT/US2010/031218, dated Nov. 17, 2010 (6 pages).
International Preliminary Report on Patentability issued in the related PCT application PCT/US2010/031218, dated Oct. 18, 2011 (4 pages).
Examination Report issued in the related AU application 2010236397, dated Apr. 22, 2015, (15 pages).
Extended Search Report issued in the related EP Application 10765176.2, dated Mar. 23, 2015 (7 pages).
Office action issued in the related EP Application 10765176.2, dated Nov. 24, 2017 (6 pages).
Extended European Search Report issued in the related EP Application 117933206.1, dated Nov. 28, 2014 (11 pages).
International Search Report and Written Opinion issued in the related PCT application PCT/US2011/039879, dated Jan. 16, 2012 (9 pages).
International Preliminary Report on Patentability issued in the related PCT application PCT/US2011/039879, dated Dec. 20, 2012 (8 pages).
Office Action issued in the related MX application MX/a/2012/013746, dated Aug. 23, 2013, (4 pages).
EP Communication Article 94-3 issued in the related EP Application 117933206.1, dated Dec. 6, 2016 (8 pages).
Examination Report issued in the related CA application 2799642, dated Mar. 13, 2017 (4 pages).
Examination Report issued in the related AU Application 2011236038, dated Jul. 28, 2015 (3 pages).
Office Action issued in the related MX application MX/a/2011/010863, dated Jan. 29, 2014, (8 pages).
Examination Report issued in the related CA application 2755231, dated Aug. 1, 2017 (5 pages).
Office Action issued in the related U.S. Appl. No. 16/113,705 dated Sep. 11, 2019 (32 pages).
Office Action issued in the related Brazil Patent Application No. PI1011343.6 dated Oct. 30, 2019, 6 pages with English translation.
Office Action issued in the related U.S. Appl. No. 16/113,705 dated Sep. 29, 2020, 13 pages.
Office Action issued in the related U.S. Appl. No. 16/724,450 dated Mar. 30, 2021, 39 pages.
Office Action issued in U.S. Appl. No. 17/621,144 dated Sep. 5, 2024, 18 pages.
First Examination report issued in Saudi Arabia patent application 120420323 on Feb. 2, 2022 (8 pages with translation).
Office Action received in NO application No. 20073677, dated Oct. 15, 2015 (6 pages with translation).
Examination Report issued in AU Application 2006205539, dated May 24, 2010 (2 pages).
Examination Report issued in CA Application 2594393, dated Apr. 12, 2011 (4 pages).
Office Action issued in the EP Application 06701794.7, dated Dec. 13, 2007 (2 pages).
Examination Report issued in IN Application 3079/CHENP/2007, dated May 24, 2012 (1 page).
Office Action issued in U.S. Appl. No. 16/724,450 dated Mar. 31, 2022, 22 pages.
First Office Action issued in Chinese Patent Application 201907963934 dated May 23, 2022, 13 pages with English translation.
Second Exam Report issued in Saudi Arabian Patent Application 120420323 dated Jun. 30, 2022, 14 pages with English translation.
Office Action issued in U.S. Appl. No. 16/724,450 dated Nov. 7, 2022, 23 pages.
Office Action issued in Mexico Patent Application No. MX/a/2019/010220 dated Apr. 13, 2023, 7 pages with English translation.
Office Action issued in U.S. Appl. No. 17/621,144 dated Apr. 11, 2024, 19 pages.
Examination Report under section 18(3) issued in United Kingdom Patent Application No. GB2118161.5 dated Apr. 19, 2024, 2 pages.
International Search Report and Written Opinion issued in International Patent application PCT/US2022/032932 on Oct. 4, 2022, 10 pages.
Nowak, Gerhard, "Computer design of electromechanical cables for ocean applications," in Proceedings of Tenth Annual Marine Technology Society Conference, Washington, DC, 1974, pp. 293-305.
Office Action issued in U.S. Appl. No. 17/621,144 dated Jul. 2, 2024, 10 pages.
Office Action issued in U.S. Appl. No. 17/806,278 dated Jun. 5, 2024, 24 pages.
Final Office Action issued in U.S. Appl. No. 17/806,278 dated Aug. 7, 2024, 22 pages.
First Examination Report issued in Saudi Arabia Patent Application No. 523451782, Dated Aug. 29, 2024, 13 pages with English translation.
Office Action issued in U.S. Appl. No. 17/806,278 dated Dec. 23, 2024, 32 pages.
First Office Action issued in Chinese Patent Application 202011534351.2 dated Jan. 22, 2025, 22 pages with English translation.
Exam Report issued in UAE Patent Application No. P6002391/2021 dated Oct. 11, 2024, 7 pages.
Third Office Action issued in Chinese Patent Application No. 2020800575714 dated Oct. 18, 2024, 20 pages with English translation.
Office Action issued in U.S. Appl. No. 17/806,278 on Oct. 31, 2024, 27 pages.
H. Ku, H. Wang, N. Pattarachaiyakoop, M. Trada, "A review on the tensile properties of natural fiber reinforced polymer composites", (56) References Cited

OTHER PUBLICATIONS

Composites Part 8: Engineering, vol. 42, Issue 4, 2011, pp. 856-873, doi:10.1016/j. compositesb.2011.01.010, 18 pages (Year: 2011).
Extended Search Report issued in European Patent Application No. 22821076.1 dated Mar. 18, 2025, 8 pages.
Notice of Allowance issued in U.S. Appl. No. 17/806,278 dated Feb. 27, 2025, 9 pages.

* cited by examiner

STRANDED FIBER-OPTIC CABLE

PRIORITY CLAIM/CROSS REFERENCE TO RELATED APPLICATION(S)

This Patent Document is a National Stage Entry of International Application No. PCT/US2020/040118, filed on Jun. 29, 2020, which claims priority under 35 U.S.C. § 120 to U.S. App. Ser. No. 62/868,321, entitled "Coupled Optical Microbundle Line" filed on Jun. 28, 2019, and incorporated herein by reference in its entirety.

BACKGROUND

Exploring, drilling and completing hydrocarbon and other wells are generally complicated, time consuming, and ultimately very expensive endeavors. In recognition of these expenses, added emphasis has been placed on efficiencies associated with well completions and maintenance over the life of the well. So, for example, enhancing efficiencies in terms of logging, perforating or any number of interventional applications may be of significant benefit, particularly as well complexity and depth continue to increase, often exceeding 30,000 feet.

One manner of conveying downhole tools into the well for the sake of logging, perforating, or a variety of other interventional applications is to use wireline or slickline cables. Wireline cables often have telemetry and power supply capabilities whereas slickline cables may be lower in profile and of limited functionality. More specifically, slickline cables may provide no more than a structural conveyance for dropping a tool or toolstring vertically into the well.

With an increased focus on efficiency, however, wireline and slickline cables may be provided with fiber optic capability. In this way, a slickline cable may be outfitted with real-time telemetric capability. Further, for both wireline and slickline cables, the addition of a fiber optic thread facilitates location specific temperature and pressure or strain measurements through conventional distributed strain and temperature (DST) techniques. This way, a degree of real-time intelligence and potential responsiveness may be provided through the conveyance. That is, a manner of controlling the tool from oilfield surface equipment is available as is real-time communications between the tool and the surface equipment.

Traditional methods of incorporating one or more fiber optic threads into a wireline or slickline cable, generally involve loose placement of the threads into the surrounding architecture of the line. For example, the fiber optic portion of the assembly is often referred to as the FIMT (fiber(s) in metal tube(s)). From a manufacturability standpoint, such packaging is practical. Additionally, allowing the fiber optics within the tube to float or migrate over the course of an application may help to prevent stress induced damage to the fibers as a result of mechanical bending and torque from the surrounding tube.

Unfortunately, placing the fiber optics loosely within the metal tube sacrifices precision in terms of the acquired data from the fiber optics. For example, because the fiber optic thread may be a notable distance from the structure of the tube, a bend in the tube may not translate into an immediately detectable or identical bend in the fiber optic thread. Similarly, leaving airspace between the thread and tube means that temperatures that the tube are exposed to at a given downhole location may not readily be translated to the fiber optic thread. By the same token, at any given location of the cable, the thread may randomly be in close physical communication with the tube at a given moment in time. At such times and locations, the stress or temperature detection via the thread may actually be fairly accurate. Of course, the operator and/or surface equipment have no way of deciphering such moments of relative improved accuracy verses any other moment. As a result, this fact only serves to complicate matters.

Of course, the possibility of eliminating the looseness and treating the fiber optic thread as any other cable component is available. For example, a jacketed thread could be directly encased by a metal tube without allowing for any intervening spacing or clearance. In theory, using such architecture would improve the accuracy of the data obtained from the thread. Unfortunately, employing such an architectural design tends to induce micro-bend fractures in the fiber optic thread. This is particularly the case where the cable depth into the well is of considerable length. In such cases, a resulting stretching of the surrounding structure would place a squeeze on the thread, thereby inducing such damage even in the absence of any undue bending. As a result, operators are generally left relying on imprecise fiber optics rather than employing a single use fiber optic cable that is prone to fail.

SUMMARY

A fiber optic cable for deployment into a well is disclosed. The cable includes multiple fiber optic threads that are stranded against one another to form a thread bundle. A package is then provided about the bundle such that the bundle and threads are mechanically responsive to the package in a coupled manner.

DETAILED DESCRIPTION

Embodiments are described with reference to certain cables and downhole applications. Specifically, the depicted embodiments herein focus on wireline or slickline applications such as performing a logging application in a well. However, alternate applications employing such cables may take advantage of the unique characteristics detailed herein. As used herein, the term "slickline" is meant to refer to an application that is run over a conveyance line that is substantially below 0.25-0.5 inches in overall outer diameter, whereas wireline applications may use slightly larger profile cables. Regardless, so long as a cable is provided with multiple fiber optic threads that are stranded against one another in a coupled manner, which translates to mechanical responsiveness during an application, appreciable benefit may be realized.

Figure 1:
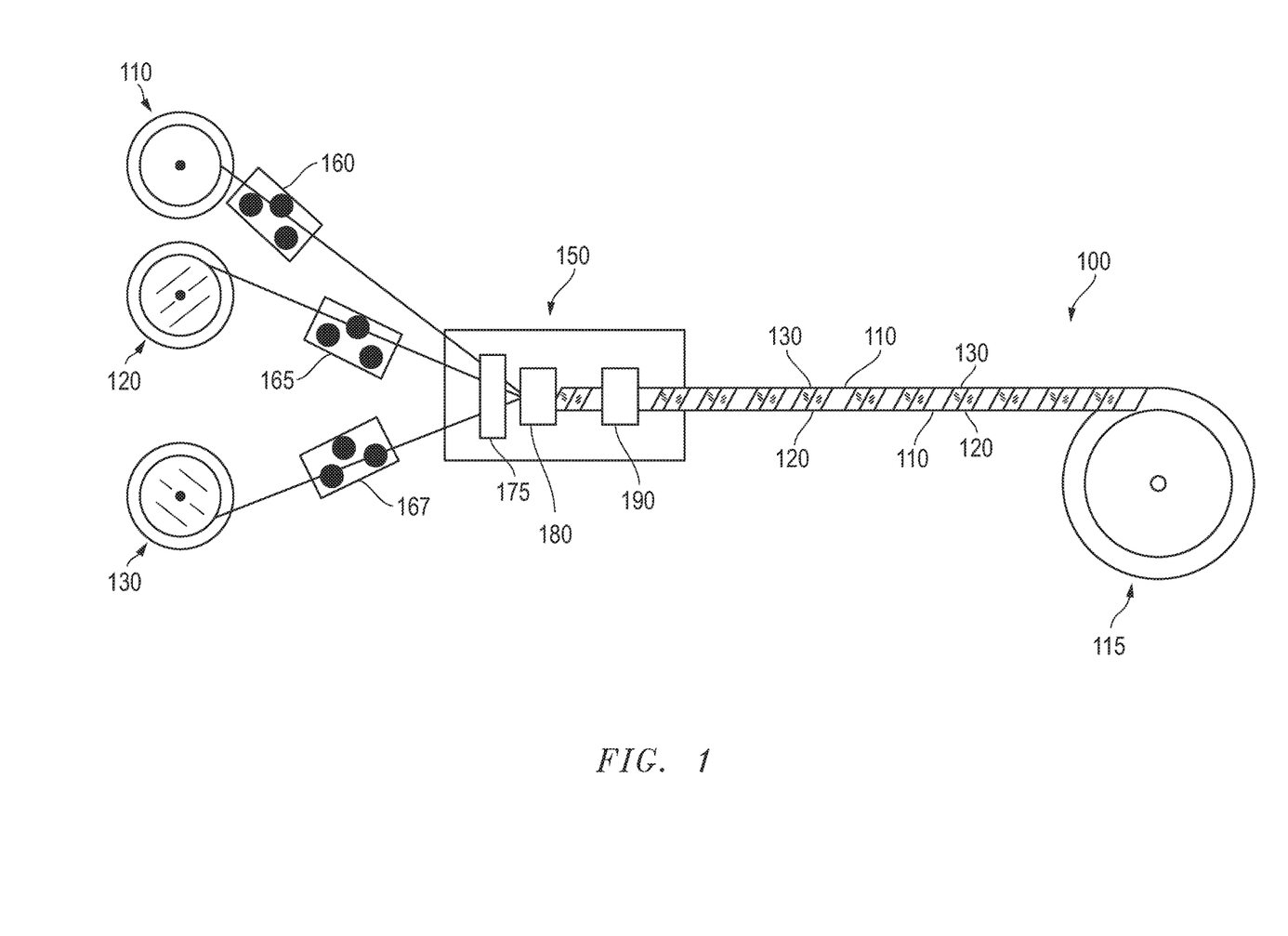
FIG. 1 is a side schematic view of an application joining multiple fiber optic threads into a microbundle.

Referring specifically now to FIG. 1, a side schematic view of an application joining multiple fiber optic threads 110, 120, 130 into a microbundle 100 in a coupled fashion is shown. As illustrated, the threads 110, 120, 130 are wound about one another in a coupled manner having direct contact. That is, in contrast to a conventional FIMT, the comparatively delicate fiber optic threads 110, 120, 130 are not only physically coupled to adjacent structure, they are physically coupled to the adjacent structure of another thread 110, 120, 130. More specifically, the threads 110, 120, 130 may be wound together as illustrated at a zero degree lay angle for structural reinforcement. Thus, these fiber optic features that are often more prone to microfracture damage from bending may be reinforced by their coupling together. This is referenced herein as providing a zero degree lay angle. This may also be thought of as a straight angle and the term "zero degree lay angle" is meant to encompass a straight angle.

Continuing with reference to FIG. 1, the threads 110, 120, 130 may be routed through individual tension sensors 160, 165, 167 and directed toward a stranding apparatus 150. More specifically, the illustrated apparatus 150 includes a separator plate 175 and a gathering die 180 configured for respectively guiding and helically winding the threads 110, 120, 130 into the noted microbundle 100 which is pulled along by a take up unit 115. Tight coordination between the gathering die 180 and the take up unit 115 is guided by information from the tension sensors 160, 165, 167 that may help determine the wind and stranding together of the threads 110, 120, 130 to ensure self-reinforcement of the assembled microbundle 100. A cut-off die 190 is also provided for terminating the microbundle 100 once a predetermined length has been attained.

A microbundle 100 as assembled may be used within an FIMT type of fiber optic line with improved resistance to microbend induced fractures as a result of the described coupling of threads 110, 120, 130. However, with the improved resistance to such fiber optic damage, more accurate fiber optic readings may occur with the microbundle 100 incorporated into more coupled structure embodiments as detailed herein below.

Figure 3:
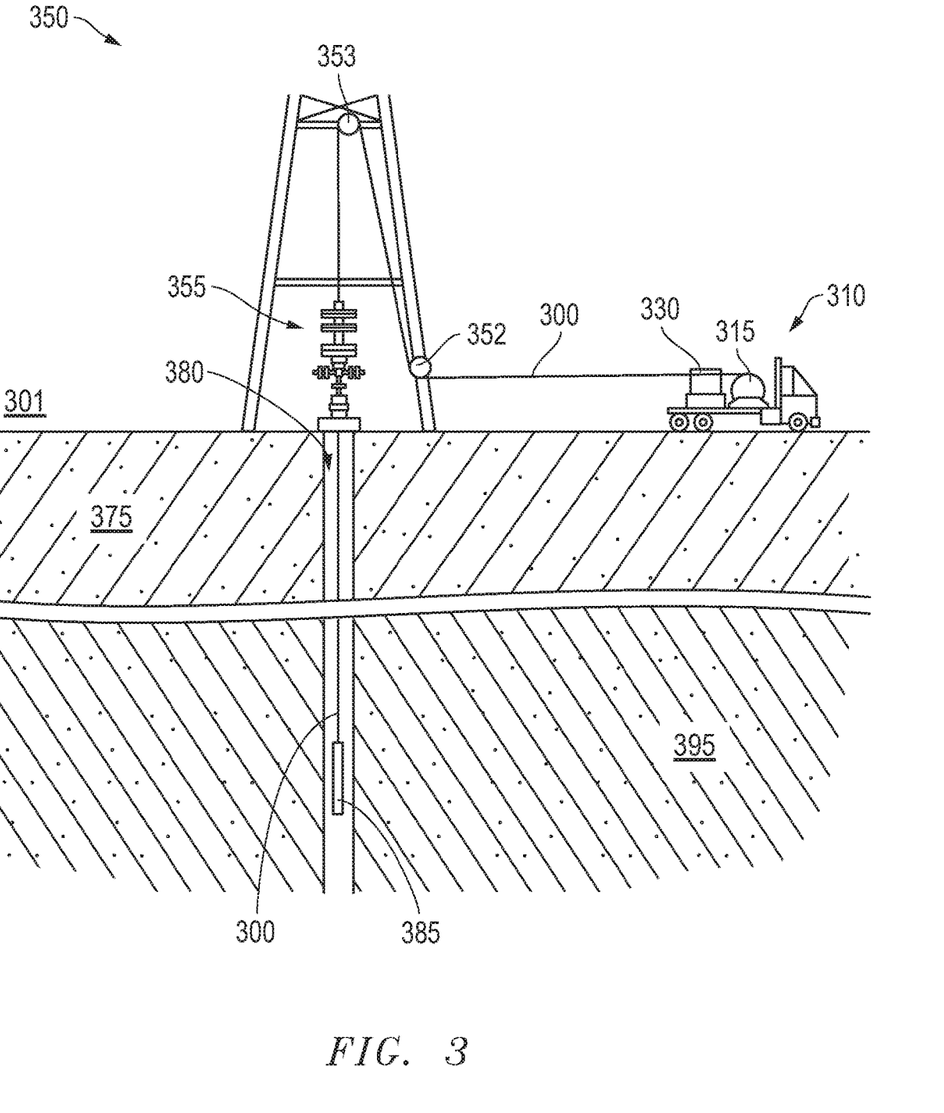
FIG. 3 is an overview of an oilfield depicting an application in a well supported by a cable incorporating the microbundle of FIG. 2B.

The microbundle 100 of FIG. 1 protects the underlying threads 110, 120, 130 from both macro and micro-bending to allow for a low optic budget and strain during manufacturing and during operations as illustrated in FIG. 3 (below). As detailed below, the concept may be employed in mono, coaxial, triad, quad and/or hepta cable configurations with or without armor, and in a semi-slic, slic or cladded variety. As with other fiber optic lines, the microbundle 100 may be optimized for multi-axial distributed strain, vibration, pressure and/or temperature measurements and combined with features for electrically conductive capacity. Thus, data and power transfer functions may be provided to and from surface when positioned in a well. With the improved function and resistance to thread microfracture, the microbundle 100 may be of longer lengths and deployed to greater well depths. Once more, avoidance of FIMT architecture allows for the construction of a cables that employ the microbundle 100 in a gas proof configuration.

Figure 2A:
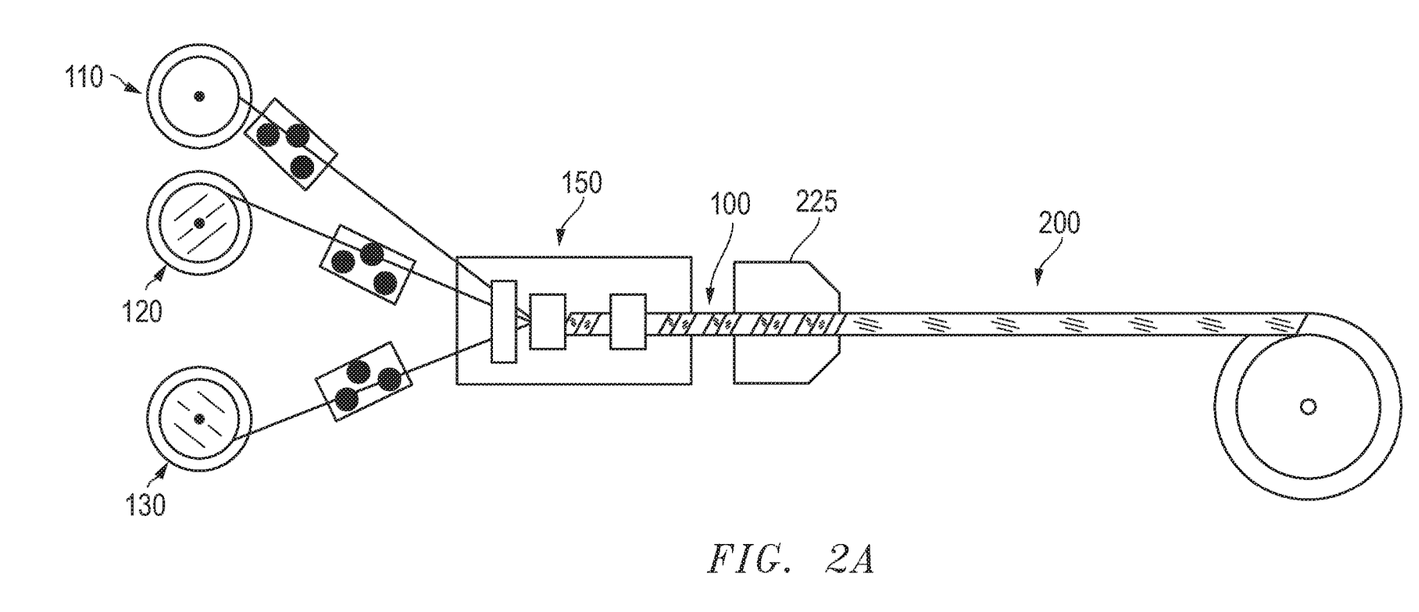
FIG. 2A is a side schematic view of the application of FIG. 1 with the added introduction of an interstitial filler to form the microbundle.
Figure 2B:
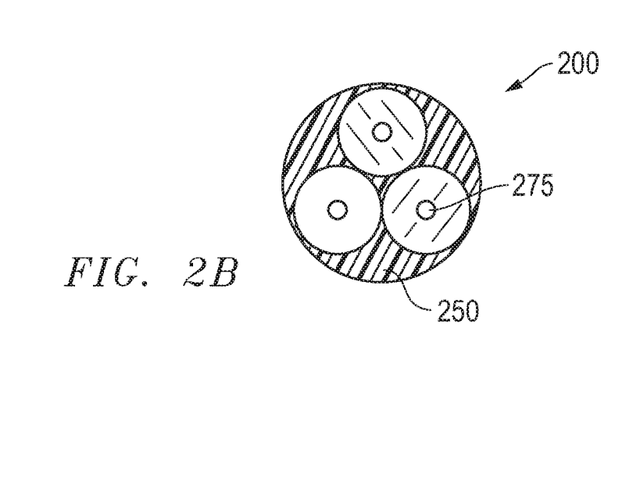
FIG. 2B is a side cross sectional view of the microbundle of FIG. 2A with interstitial filler.

Referring now to FIGS. 2A and 2B, a side schematic view of the application of FIG. 1 with the added introduction of an interstitial filler is illustrated to form a filled microbundle 200. Specifically, the microbundle 100 of FIG. 1 is run through a fill device 225 to supply a polymeric filler 250 to attain the filled microbundle 200. Thus, as illustrated in the cross-section of FIG. 2B, interstitial space may be filled with the filler 250 thereby rendering a filled microbundle 100 which may be of improved workability, for example in construction of the cable 300 of FIG. 3 as detailed further below. Note that the fiber optic structure 275 is of a jacketed variety in the depicted embodiment, even prior to introduction of the filler 250. However, this is not necessarily a requirement.

In one embodiment, the polymeric filler 250 is silicon. However, other suitable materials may be utilized. Regardless, filling the interstitial spaces of the initial microbundle 100 may help prevent gas migration as well as add support and protection for application purposes as illustrated in FIG. 3. In the embodiment shown, the fill device 225 is also utilized for curing of the filled microbundle 200 as it begins to exit the device 225, for example, by way of ultraviolet (UV) radiation or heat. However, alternative curing techniques may be employed in advance of the filled microbundle 200 reaching the take-up reel 115.

Referring specifically now to FIG. 3, with added reference to FIGS. 2A and 2B, an overview of an oilfield 301 is illustrated where a cable 300 constructed from the filled microbundle 200 is deployed in a well 380 to support a logging application. Given that the filled microbundle cable 300 includes fiber optic threads 110, 120, 130 that are coupled to one another, the entirety of the cable 300 may be coupled in a manner that includes fiber optic mechanical responsiveness. That is, in contrast to a conventional FIMT assembly, the cable 300 in the well 380 of FIG. 3 may include fiber optics that are physically coupled to structure all the way to the exterior surface of the cable 300, fiber optic detections may be more direct and/or "mechanically responsive." This is due to the absence of hollow tubing structure which is made possible by the direct stranding of the threads 110, 120, 130 to one another.

Continuing with reference to FIG. 3, the cable 300 is specifically suspended within the well 280 to deploy a logging tool 385 for a logging application. In this way, well characteristic information may be acquired as the tool 385 traverses various formation layers 375, 395. Thus, the logging application and tool 385 may benefit from the capacity for telemetry over the fiber optics of the cable 300. For example, as shown in FIG. 3, the oilfield 301 is outfitted with a host of surface equipment 350 such as a truck 310 for sake of mobile cable delivery from a drum 315. However, in the embodiment shown, the truck 310 also accommodates a control unit 330 which may house a processor and power means for interfacing with the downhole logging tool 385. Thus, rather than run a logging application with a tool limited to a downhole battery and recorder for later analysis, an application may be run in which the tool 385 is provided with sufficient power and data therefrom being acquired by the unit 330 in real-time.

To effectively run such a real-time downhole application as described above, the cable 300 is of a unique architecture that enhances accuracy of fiber optic readings obtained without undue stress being placed on the fiber optic components due to the zero lay angled coupling described above. With continued added reference to FIGS. 2A and 2B, the term "mechanically responsive" is utilized to highlight the substantial reduction or elimination of the use of a hollow tube to accommodate the filled microbundle 200. That is, as detailed in the embodiments below, the surrounding structure of the cable 300 is in direct contact with the microbundle 200. So, for example, fiber optic detection of mechanical cable bending may be ascertained with a greater degree of accuracy. However, it is also worth noting that with the elimination of hollow tube construction, mechanical responsiveness is not the only fiber optic detection that is enhanced. Indeed, pressure, temperature or any detections ascertainable from the fiber optic components are also enhanced. For example, consider how the reduction or elimination of airspace increases fiber optic sensitivity to temperature readings from the well 380. In essence, the cable 300 is constructed in a unique coupled manner without hollow tubing and in a manner that protects delicate fiber optic components. Thus, fiber optic detections are enhanced without undue harm to the components.

Figures 4A, 4B:
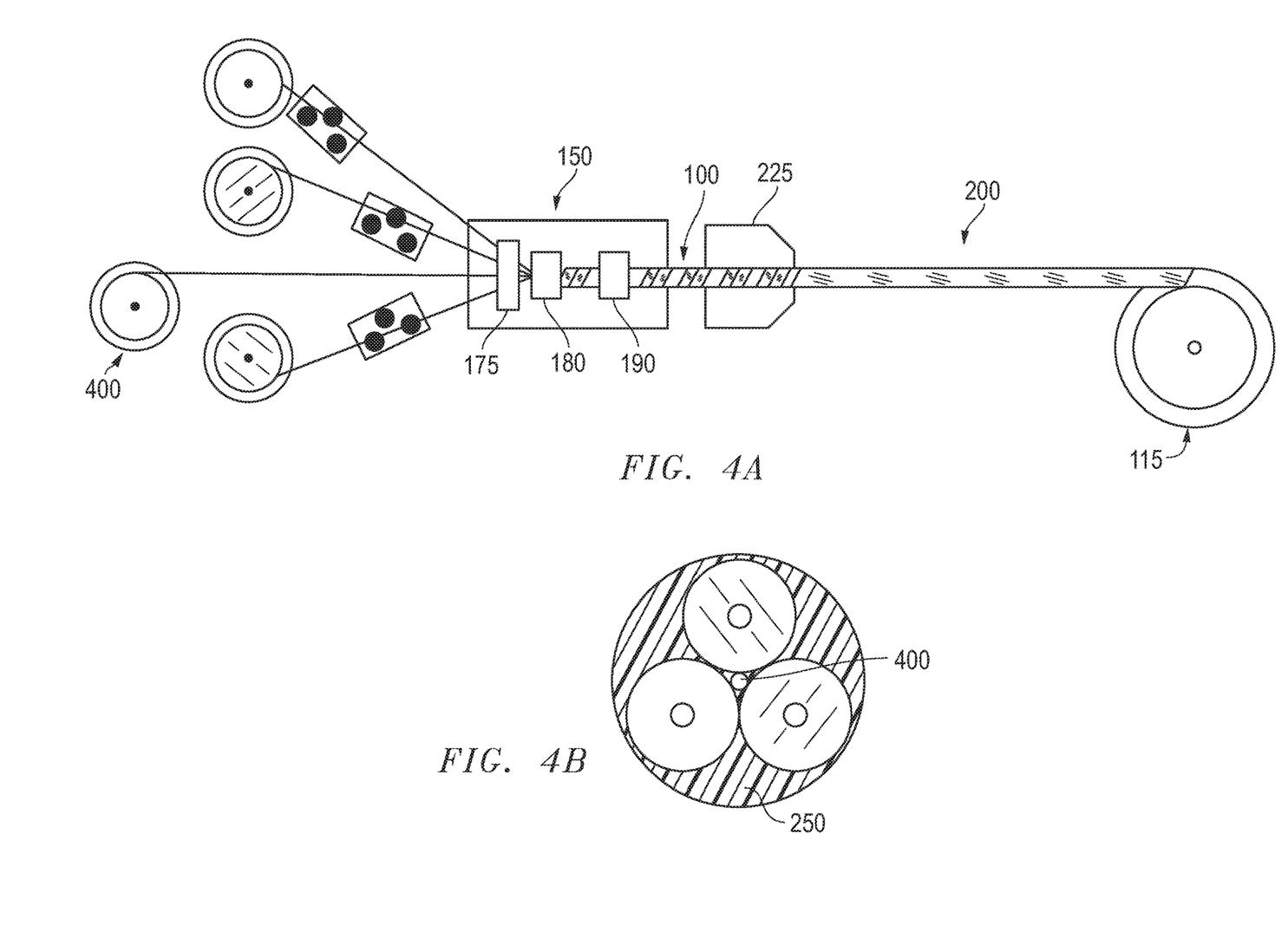
FIG. 4A is a side schematic view of the application of FIG. 2A with the added introduction of a central filler to form the microbundle.
FIG. 4B is a side cross-sectional view of the microbundle of FIG. 4A with the central filler.

Referring now to FIGS. 4A and 4B, another filled microbundle 200 is illustrated with the addition of a filler support 400. That is, in conjunction with the stranding of the fiber optic threads 110, 120, 130, a strand of filler support 400 may be coupled to the threads 110, 120, 130. More specifically, as the cross-section of FIG. 4B illustrates, a filler support 400 located in the region between the threads 110, 120, 130 may be uniquely positioned for added structural support. This is particularly advantageous where the threads 110, 120, 130 number three or more and naturally give rise to this region. In this way, the threads 110, 120, 130 may attain support from the filler support 400 in addition to the support attained from the coupling to one another at the noted zero degree lay angle. The filler support 400 may be poly-paraphenylene terephthalamide, an aramid yarn, a polymer filled yarn, a polymeric monofilament such as a fluoropolymer or polyether ether ketone, or other suitable materials.

Figure 5A:
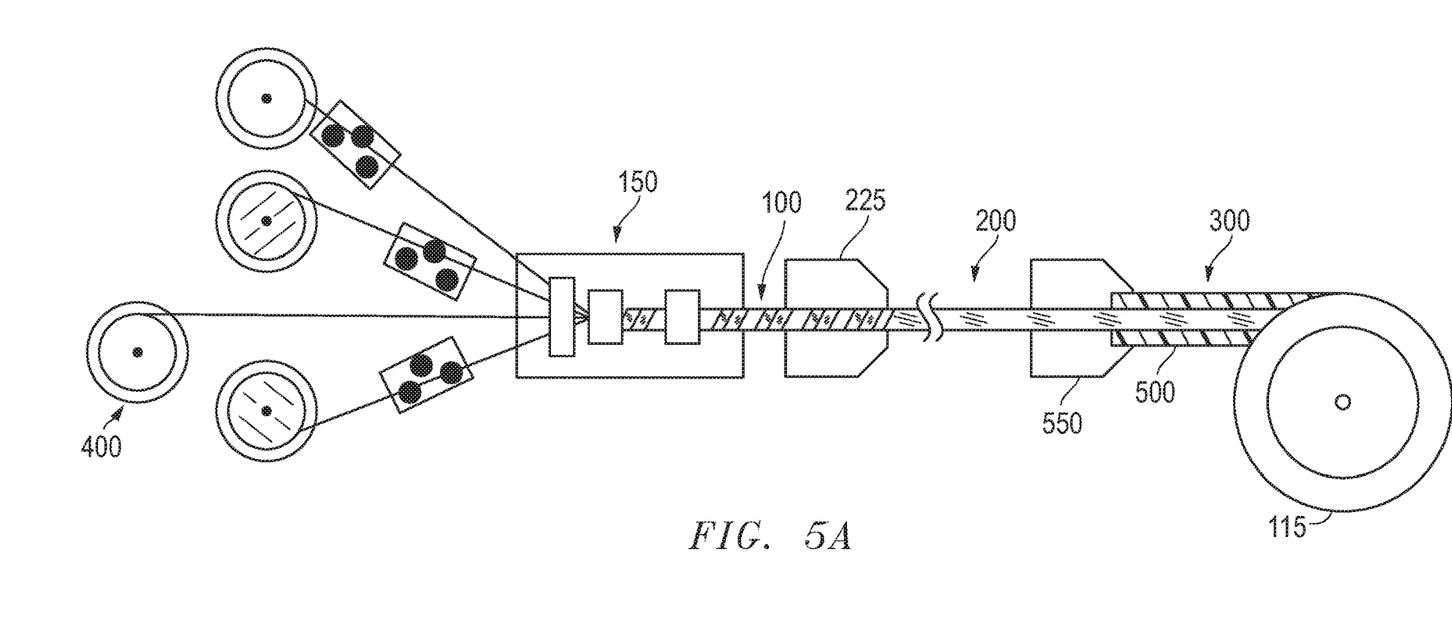
FIG. 5A is a side schematic view of the application of FIG. 4A with the added introduction of supplying a jacket to the microbundle to form the cable of FIG. 3.
Figure 5B:
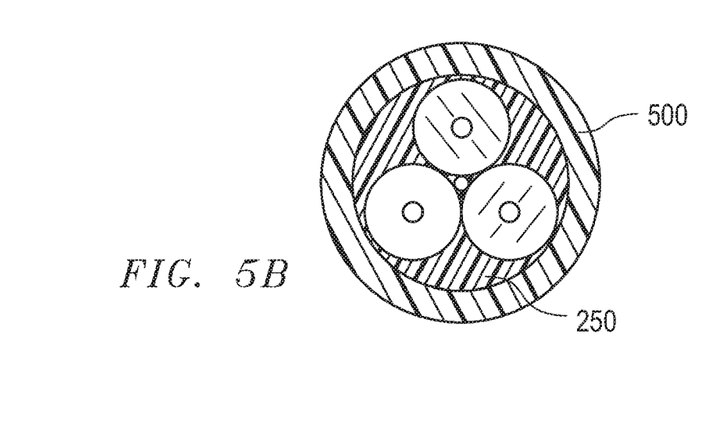
FIG. 5B is a side cross-sectional view of the cable of FIGS. 3 and 5A.

Referring now to FIGS. 5A and 5B, completing the cable 300 as illustrated in FIG. 3 may be a matter of jacketing the filled microbundle 200 with a polymeric jacket 500. For example, in the embodiment shown, the microbundle 100 may be processed into a filled microbundle 200 with a filler support 400 and then jacketed at an extrusion device 550 similar to the fill device 225. Indeed, in the embodiment shown, curing of the jacket 500 may also take place at the extrusion device 550 similar to the manner in which filler 250 was cured at the fill device as described above. Of course, as detailed below, a variety of other architectural configurations may benefit from the availability of a coupled fiber optic microbundle 100 as described above.

Referring now to FIGS. 6A-6F, a filled microbundle 200 is shown incorporated into a variety of different architectural configurations for cables 300 such as may be deployed in an application as illustrated at FIG. 3. The embodiment of FIG. 6A, for example, is the jacketed cable 300 of FIGS. 5A and 5B, including the filler support 400, which has been further processed for the addition of an outer metal cladding 601.

Figure 6A:
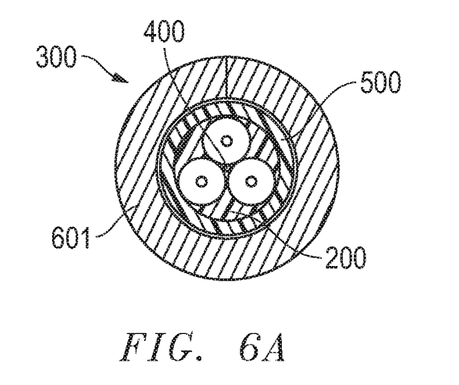
FIG. 6A is a side cross-sectional view of the microbundle and cable of FIG. 5A with added cladding.
Figure 6B:
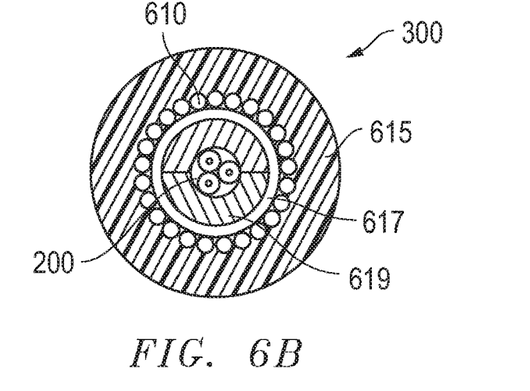
FIG. 6B is a side cross-sectional view of the microbundle of FIG. 2B with added architecture of symmetrical conductors and jacketing.
Figure 6C:
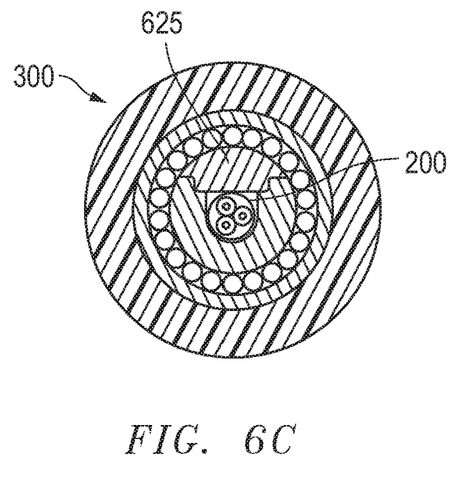
FIG. 6C is a is a side cross-sectional view of the microbundle of FIG. 2B with added architecture of asymmetrical conductors and jacketing.
Figure 6D:
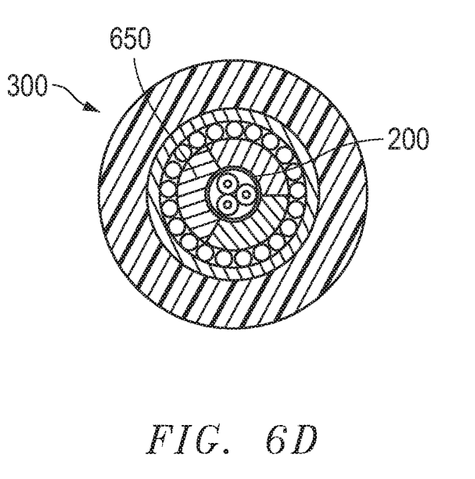
FIG. 6D is a side cross-sectional view of the microbundle of FIG. 2B with added architecture of strength members, armor wire and cladding.

With specific reference to FIG. 6B, symmetrical electrical conductors 619 have been located about the filled microbundle 200. Cladding 617 has again been provided along with additional perimeter conductors 610 and a polymeric jacket 615. Of course, as illustrated in FIG. 6C, the internal conductors 625 may be asymmetrical or "wedged" rather than symmetrical and the cladding may be located external to both internal and perimeter conductors. With reference to FIG. 6D, the internal conductors 650 may be symmetrical but odd in number.

Figure 6E:
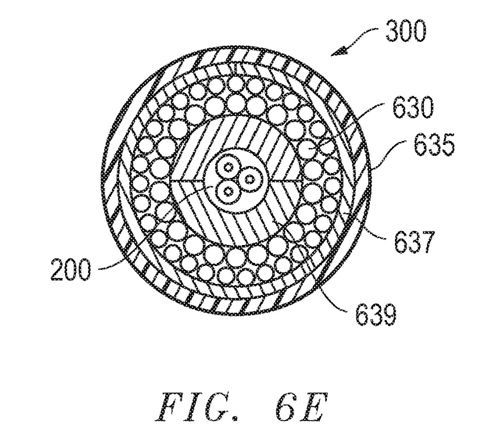
FIG. 6E is a side cross-sectional view of the microbundle of FIG. 2B with added architecture of conductors, cladding and jacketing.
Figure 6F:
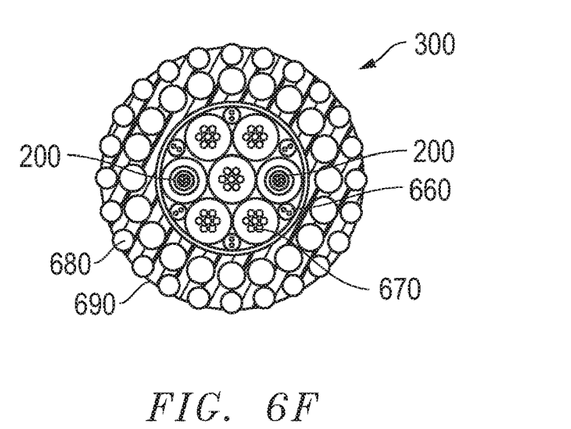
FIG. 6F is a side cross-sectional view of multiple microbundles of FIG. 2B incorporated into a cable with added architecture of conductors in a coaxial configuration.

With reference to FIG. 6E, electrical capacity may be less of a focus with the utilization of internal strength members 639, armor wires 630, cladding 637 and an external polymeric jacket 635. Further, as illustrated in 6F, the filled microbundle 200 may even be provided in duplicate. Thus, readings from different sides of the cable 300 may be analyzed. In the embodiment shown, conductors 670, supplemental fiber optics and additional armor wires 680 embedded in a polymeric jacket 690 are also employed.

Regardless of the particular embodiment, the availability of a coupled microbundle 200 employing a zero degree lay angle among the separate fiber optics means that it may be filled and utilized to construct any number of mechanically responsive fiber optic cables 300. The cables 300 may not only be of enhanced fiber optic durability but may also be substantially free of void space and thus, less prone to gas migration during an application. Thus, the cable 300 itself may also be of enhanced reliability.

Figure 7:
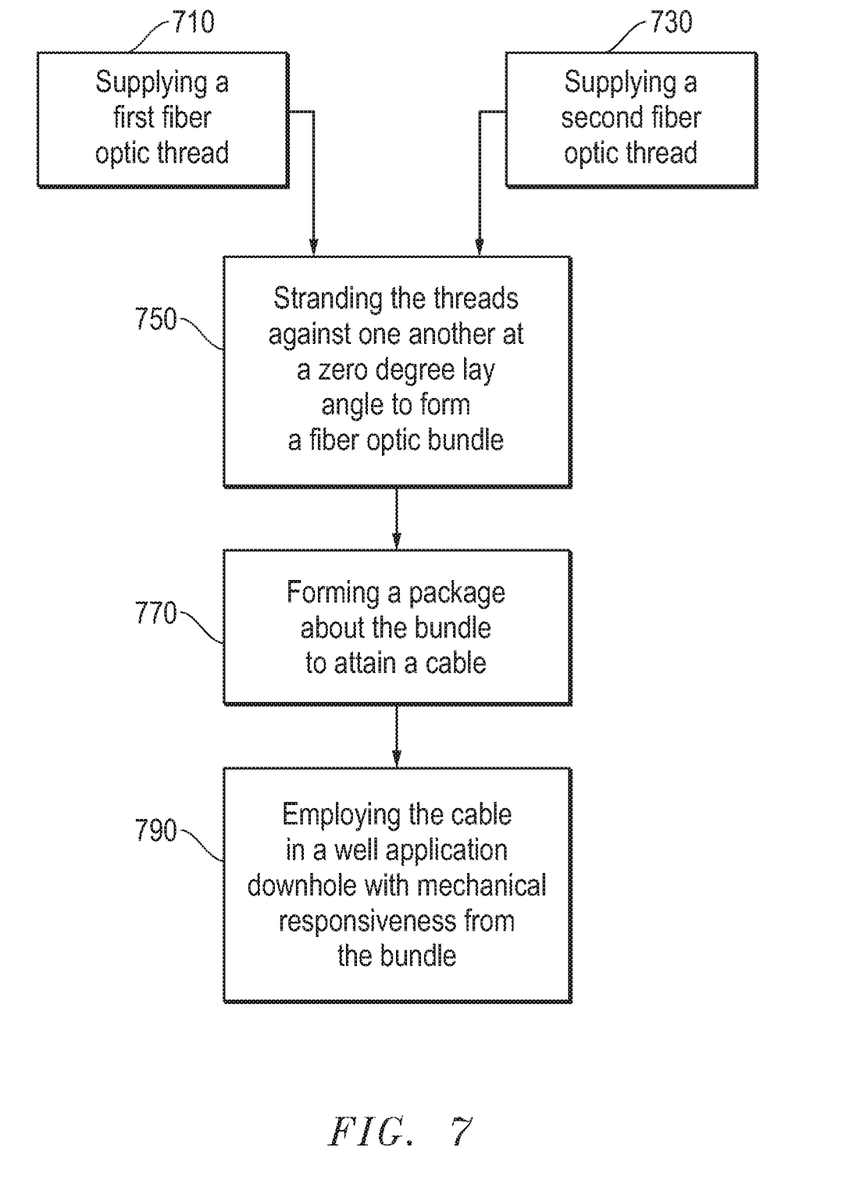
FIG. 7 is a flowchart summarizing an embodiment of manufacturing a cable with a microbundle having multiple fiber optic threads stranded against one another.

Referring now to FIG. 7, a flowchart summarizing an embodiment of manufacturing a cable with a microbundle having multiple fiber optic threads stranded against one another is shown. As indicated at 710 and 730, at least two fiber optic threads are supplied such that they are available for stranding against one another. Thus, a zero degree lay angle is employed as noted at 750 such that generally delicate fiber optics are employed to reinforce one another. The resulting bundle may be packaged with additional structure as indicated at 770. As a result, a mechanically responsive fiber optic assembly is available for reliable use in a downhole well application (see 790).

Embodiments detailed hereinabove avoid the looseness and hollow aspects found in conventional FIMT construction. Therefore, the fiber optic line embodiments provided display a mechanical responsiveness for added accuracy in downhole well detections. Additionally, the embodiments also provide enhanced reliability to the fiber optics by utilizing multiple threads coupled to one another at a zero degree lay angle. As a result, the fiber optics include structural reinforcement that enhance durability and allow for practical, reliable use of the line in well applications.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Regardless, the foregoing description should not be read as pertaining only to the precise structures described and shown in the accompanying drawings, but rather should be read as consistent with and as support for the following claims, which are to have their fullest and fairest scope.

What is claimed is:

1. A fiber optic bundle for incorporation into a cable to support an application in a well, the fiber optic bundle comprising:
   a microbundle having:
      a first fiber optic thread;
      a second fiber optic thread stranded against the first fiber optic thread at a zero degree lay angle, wherein the second fiber optic thread is in direct contact with the first fiber optic thread;
      a third fiber optic thread stranded against the first fiber optic thread and the second fiber optic thread at the zero degree lay angle, wherein the third fiber optic thread is in direct contact with the second fiber optic thread;
      a filler support disposed at a central axis of the microbundle to structurally support the first fiber optic thread, the second fiber optic thread, and the third fiber optic thread; and
      an interstitial filler filling interstitial spaces of the microbundle, the interstitial filler comprising a polymer filler; and
   a jacket disposed about the microbundle to form a filled bundle, wherein the jacket is in direct contact with the interstitial filler of the microbundle.

2. The fiber optic bundle of claim 1, wherein the cable is one of has an FIMT construction or a coupled configuration.

3. The fiber optic bundle of claim 2, wherein the cable has a coupled configuration, and wherein the coupled configuration has a gas proof configuration or a fiber optic mechanically responsive configuration during the application in the well.

4. The fiber optic bundle of claim 2, wherein the coupled configuration includes a second filled bundle.

5. The fiber optic bundle of claim 2, wherein the coupled configuration includes jacketing about the filled bundle.

6. The fiber optic bundle of claim 5, wherein the jacketing includes at least one of polymeric layer, a cladding, conductors, armor wires, or strength members.

7. The fiber optic bundle of claim 1, wherein the filler support includes a poly paraphenylene terephthalamide, an aramid yarn, a polymer filled yarn, a polymeric monofilament, a fluoropolymer, or a polyetherether ketone.

8. The fiber optic bundle of claim 1, further comprising a metal cladding disposed about the filled bundle.

9. A method comprising:
   supplying a filler support;
   supplying a first fiber optic thread;
   stranding a second fiber optic thread and a third fiber optic thread with the first fiber optic thread at a zero degree lay angle in a coupled manner to form around the filler support, wherein the first fiber optic thread, the second fiber optic thread, and the third fiber optic thread are coupled such that the second fiber optic thread is in direct contact with the first fiber optic thread and the third fiber optic thread is in direct contact with the second fiber optic thread;
   filling interstitial spaces between the first fiber optic thread, the second fiber optic thread, and the third fiber optic thread with an interstitial filler to form a microbundle; and
   disposing a jacket about the microbundle to form a filled bundle, the filled bundle formed such that the jacket is in direct contact with the interstitial filler of the microbundle.

10. The method of claim 9, wherein the stranding comprises employing information from tension sensors to direct a take-up unit in driving the stranding of the second fiber optic thread and the third fiber optic thread with the first fiber optic thread.

11. The method of claim 9, further comprising constructing a package about the filled bundle to form a gas proof coupled structure of fiber optic mechanical responsiveness.

12. The method of claim 11 further comprising:
   incorporating the package into a cable; and
   performing an application in a well with the cable.

13. The method of claim 12, wherein the incorporating includes jacketing the package with at least one of polymer, a cladding, conductors, armor wires, or strength members.

14. The method of claim 9, wherein disposing the jacket about the microbundle is performed via extrusion.

15. A fiber optic bundle for incorporation into a cable to support an application in a well, the fiber optic bundle comprising:
   a microbundle having:
      a first fiber optic thread;
      a second fiber optic thread stranded against the first fiber optic thread at a zero degree lay angle, wherein the second fiber optic thread is in direct contact with the first fiber optic thread;
      a third fiber optic thread stranded against the first fiber optic thread and the second fiber optic thread at a zero degree lay angle, wherein the third fiber optic thread is in direct contact with the second fiber optic thread;
      a filler support disposed at a central axis of the microbundle to structurally support the first fiber optic thread, the second fiber optic thread, and the third fiber optic thread; and
      an interstitial filler filling interstitial spaces of the microbundle, the interstitial filler comprising a polymer filler; and
   a jacket disposed about the microbundle.

16. The fiber optic bundle of claim 15, further comprising one or more electrical conductors disposed about the microbundle, wherein the jacket is disposed about the one or more electrical conductors.

17. The fiber optic bundle of claim 16, wherein the one or more electrical conductors are disposed asymmetrically about the microbundle.

18. The fiber optic bundle of claim 16, further comprising a cladding and a set of perimeter conductors, wherein the cladding and the set of perimeter conductors are disposed about the one or more electrical conductors, and wherein the jacket is disposed about the cladding and the set of perimeter conductors.

* * * * *